No. 696,157. Patented Mar. 25, 1902.
A. H. BAINVILLE.
ELECTRODE FOR SECONDARY BATTERIES.
(Application filed Dec. 30, 1901.)
(No Model.)
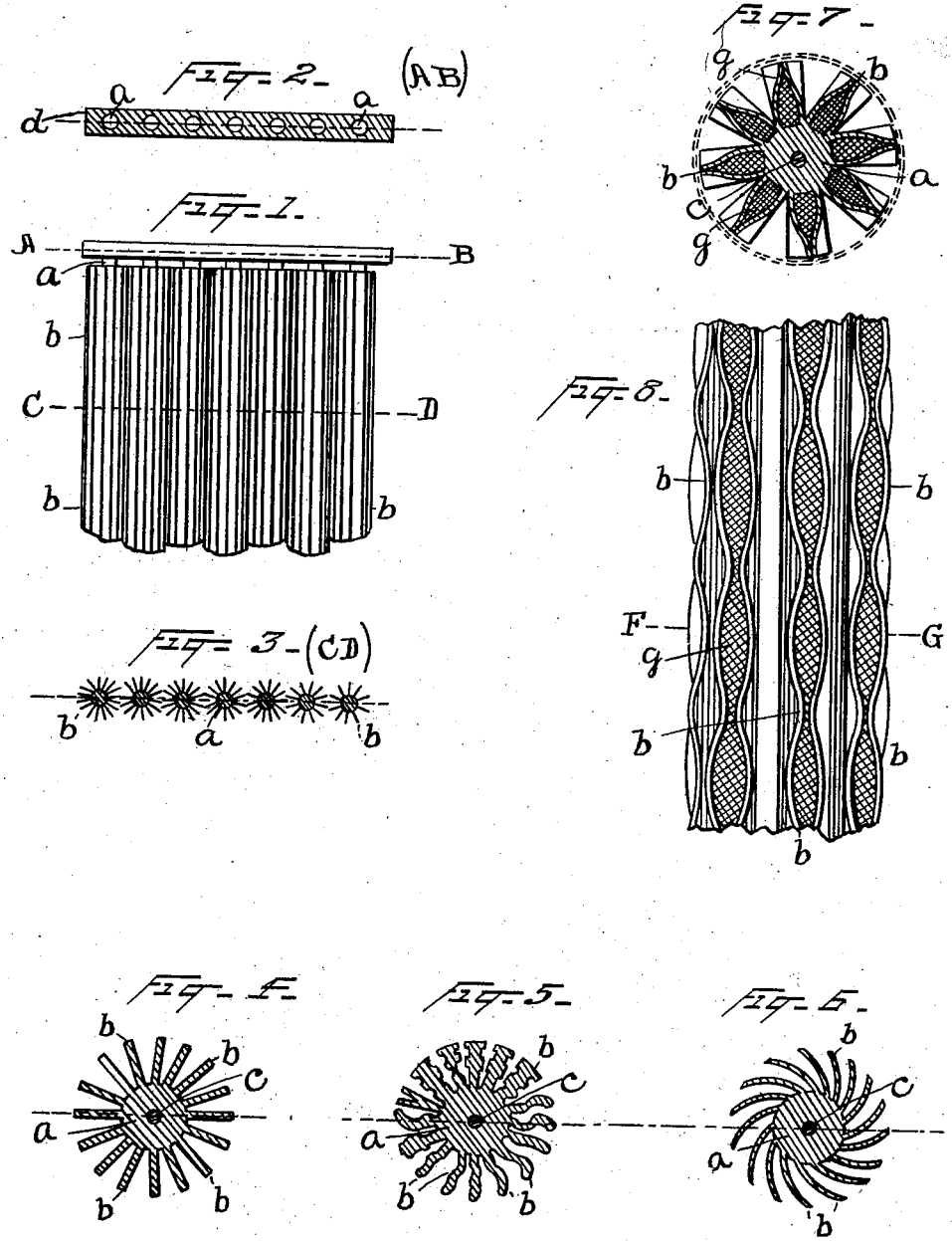

UNITED STATES PATENT OFFICE.

AUGUSTE HENRI BAINVILLE, OF NANTERRE, FRANCE.

ELECTRODE FOR SECONDARY BATTERIES.

SPECIFICATION forming part of Letters Patent No. 696,157, dated March 25, 1902.

Application filed December 30, 1901. Serial No. 87,839. (No model.)

*To all whom it may concern:*

Be it known that I, AUGUSTE HENRI BAINVILLE, engineer, a citizen of the French Republic, residing at 6 Avenue Rochegude, Nanterre, Seine, France, have invented a new and useful Electrode for Electric Accumulators; and I do hereby declare the following to be a full, clear, and exact description of the same.

The present invention consists of a new electrode for electric accumulators. Said electrode is made by drawing lead or any other convenient metal or alloy through a drawing-plate of appropriate form, the rods resulting from this drawing being made with a massive central core, described farther on, provided or not at the center with a rod or any metal wire which is a good conductor of electricity—as, for instance, aluminium—which wire is drawn forth during the wire-drawing by the material selected to constitute the core so that it is in intimate contact with the latter, being at the same time protected by it against electrolytic actions. The massive form of the core allows the employment of the quantity of metal which is just sufficient for the passage of the current, maintaining at the same time the rigidity of the rod, which, if necessary, may be increased by the addition of the central wire. These rods with massive core constitute elementary electrodes of electric accumulators. In order to build up plates of accumulators with these rods, I group them, for example, on a transverse bar of lead or lead alloy or any other convenient metal of any shape whatever with which they are connected electrically, this bar serving for the reception of the current. The purpose of this construction is to maintain the rods in a vertical position in such a manner that they may expand freely and that when the battery is in operation the active matter which may drop from the plates thus made is never retained, but falls freely to the bottom of the vessel.

The invention consists likewise in an electrode of this kind provided with cells obtained by pressing from place to place, the one against the other, two consecutive sheets, so as to constitute small separate compartments, within which active matter is introduced for effecting the formation of the plates more rapidly. The cells sufficiently maintain the active matter until the complete formation of the plate; but under the influence of the electrolytic actions the parts of the sheets which previously have been brought nearer to each other separate gradually to return to their original position, and thus allow the active matter to fall in such a manner that when the plate is completely formed the whole surface thereof is being subjected to the action of the electrolyte.

In the accompanying drawings, Figure 1 is a view in elevation of a part of my new accumulator-plate. Figs. 2 and 3 are respectively transverse sections on the lines A B and C D of Fig. 1. Figs. 4, 5, and 6 represent transverse sections of accumulator-rods wire-drawn after different profiles, and Figs. 7 and 8 are respectively a transverse section and a view in elevation of a part of rod having cells filled with active matter.

The accumulator-plates thus constituted may have various forms and any dimensions desired.

The wire-drawn rods are composed of a massive metallic core $a$ in Figs. 4, 5, 6, and 7, around which radiate thin sheets or blades $b$, projecting from the massive mass of the core and forming around the same large projections. These sheets may be smooth, Figs. 4 and 6, undulated, plaited, ribbed, Fig. 5, or have any form which one may obtain by direct wire-drawing. These rods may likewise be worked after wire-drawing in such a manner as to modify the sheets $b$, which radiate around the core $a$, either by plaiting or by perforation, or especially by the pinching or pressing of two consecutive sheets the one against the other in such a way as to form cells $g$, as represented in Figs. 7 and 8, in which cells is maintained the active matter destined to accelerate the formation of the plate. By using lead or its alloys one obtains the wire-drawn rods by the pressure of the metal either in the heated or cold state, and during the wire-drawing one may introduce into the central part of the rod a wire $c$, made of any metal which is a good conductor of electricity—as, for instance, aluminium. This wire is carried away during the wire-drawing by the drawn-out mass itself, and then by the pressure exercised upon this latter during the operation there is produced an intimate contact between the rod and the wire, so that the introduction of the wire into the core facilitates the manufacture of the rods and the solidity of the same. The wire $c$ being entirely inclosed by the metal of the rod $a$ is not subjected to the electrolytic actions, and thus presents a constant section for the passage of the current.

In practice one generally employs for the rods the plainest form, which consists in a cylindric massive core $a$, provided or not with the central wire, and from which emerge the blades disposed parallel to the axis of the cylinder. These blades $b$, Fig. 4, are in such number that the total of their thicknesses is about equal to the circumference of the core which supports them. With the same model of rod accumulator-plates of any capacity whatever are constructed by properly modifying the number and the length of the elementary rods.

One may construct by means of these wire-drawn rods either plates with autogenous formation or plates with oxid. In the first case the plates are subjected to the ordinary process of formation. One may accelerate this by the use of cells of active matter, $g$, obtained by pressing one against the other two consecutive blades, as represented in Figs. 7 and 8. In the second case there are two ways—either to furnish the intervals between the blades with lead oxids properly prepared or to put the rods properly furnished with lead oxids in a porous covering—such as in waste-pipe, asbestos, or any other proper material—as indicated by the dotted lines in Fig. 7.

This construction secures an excellent distribution of the current, because the current is brought to the blades inclosing the core, which constitute the active surface of the element, by a rod nearly entirely protected against electrolytic actions by the blades, this rod having besides a section proportionate to this active surface for a same thickness and breadth of the blades. This construction, besides, enables us to obtain a large active surface with a much-reduced weight. Furthermore, this construction absolutely avoids any deformation of the accumulator-plate, thanks to the perfect symmetry in the construction and in the distribution of the current. It allows the construction of electric accumulator plates or elements in a very economical manner as well from the standpoint of mechanical workmanship as from that of the cost.

Having thus fully and clearly described my invention, what I claim as new, and desire to secure by Letters Patent, is—

1. An electrode for accumulators, consisting of a massive central rod provided with radiating blades, the surfaces of adjacent blades approaching each other at intervals.

2. An electrode for accumulators, consisting of a central rod provided with integral radiating longitudinal blades approaching each other at intervals, and a tubular jacket of the same material as the rod inclosing said blades.

3. An electrode for accumulators, consisting of a massive central rod provided with integral radiating blades pressed together at several points to form cells for the active matter.

In testimony whereof I have signed this specification in the presence of two subscribing witnesses.

AUGUSTE HENRI BAINVILLE.

Witnesses:
LÉON GAUMONT,
EUGÈNE CLIRE.